United States Patent [19]

Woinsky

[11] 4,324,102
[45] Apr. 13, 1982

[54] PROCESS AND SYSTEM FOR RECOVERY OF ENERGY FROM GEOTHERMAL BRINES AND OTHER HOT WATER SOURCES

[75] Inventor: Samuel G. Woinsky, Irvine, Calif.

[73] Assignee: Occidental Petroleum Corporation

[21] Appl. No.: 76,677

[22] Filed: Sep. 19, 1979

Related U.S. Application Data

[63] Continuation of Ser. No. 589,068, Jun. 23, 1975, abandoned.

[51] Int. Cl.³ .............................................. F03G 7/00
[52] U.S. Cl. ................................................. 60/641.3
[58] Field of Search ........................................ 60/641

[56] References Cited
U.S. PATENT DOCUMENTS

| | | | |
|---|---|---|---|
| 2,222,575 | 11/1940 | Schutte | 122/31 |
| 2,561,471 | 7/1951 | Hatfield | 122/31 |
| 3,845,627 | 11/1974 | Hutchinson | 60/651 |
| 3,988,895 | 11/1976 | Scheinbaum | 60/641 |

Primary Examiner—Allen M. Ostrager
Attorney, Agent, or Firm—Max Geldin; R. J. Baran

[57] ABSTRACT

Process and system for recovery of energy from geothermal brines and other hot water sources, which comprises direct contact heat exchange between the brine or hot water, and a hydrocarbon working fluid, e.g. n-butane, in a heat transfer column, the heat transfer column being operated at or above the critical pressure of the working fluid, and the hot brine or hot water feed being at a temperature at or above the critical temperature of the working fluid. The heated working fluid exiting the top of the heat transfer column is expanded through an expander to produce work. The discharge from the expander is cooled to condense working fluid which is separated in an accumulator, from condensed water vapor present in the working fluid, and the condensed working fluid is pressurized and fed back to the heat transfer column.

Cooled brine or water from the bottom of the heat transfer column and water from the accumulator are fed to a flashing device such as a flash drum operated at a pressure less than that in the accumulator, and the working fluid flashed off is compressed and returned to the cooler at the expander discharge, for condensation and recovery. Uncondensible gases plus working fluid losses are vented from the accumulator. Cold brine or water is discharged from the flashing means such as the flash drum, and any scale formed in the heat transfer column is discharged from the bottom thereof.

Alternatively, if the flash drum is employed as a stripping column, a portion of the vent gas from the accumulator can be recycled as stripping gas to the stripping column for recovery of working fluids therefrom.

Preferably, the feed brine or hot water is degassed prior to entry into the heat transfer column, and such degassing combined with proper control of accumulator pressure provides an economic balance between energy recovery in the system and working fluid loss in the vent gas from the accumulator.

28 Claims, 5 Drawing Figures

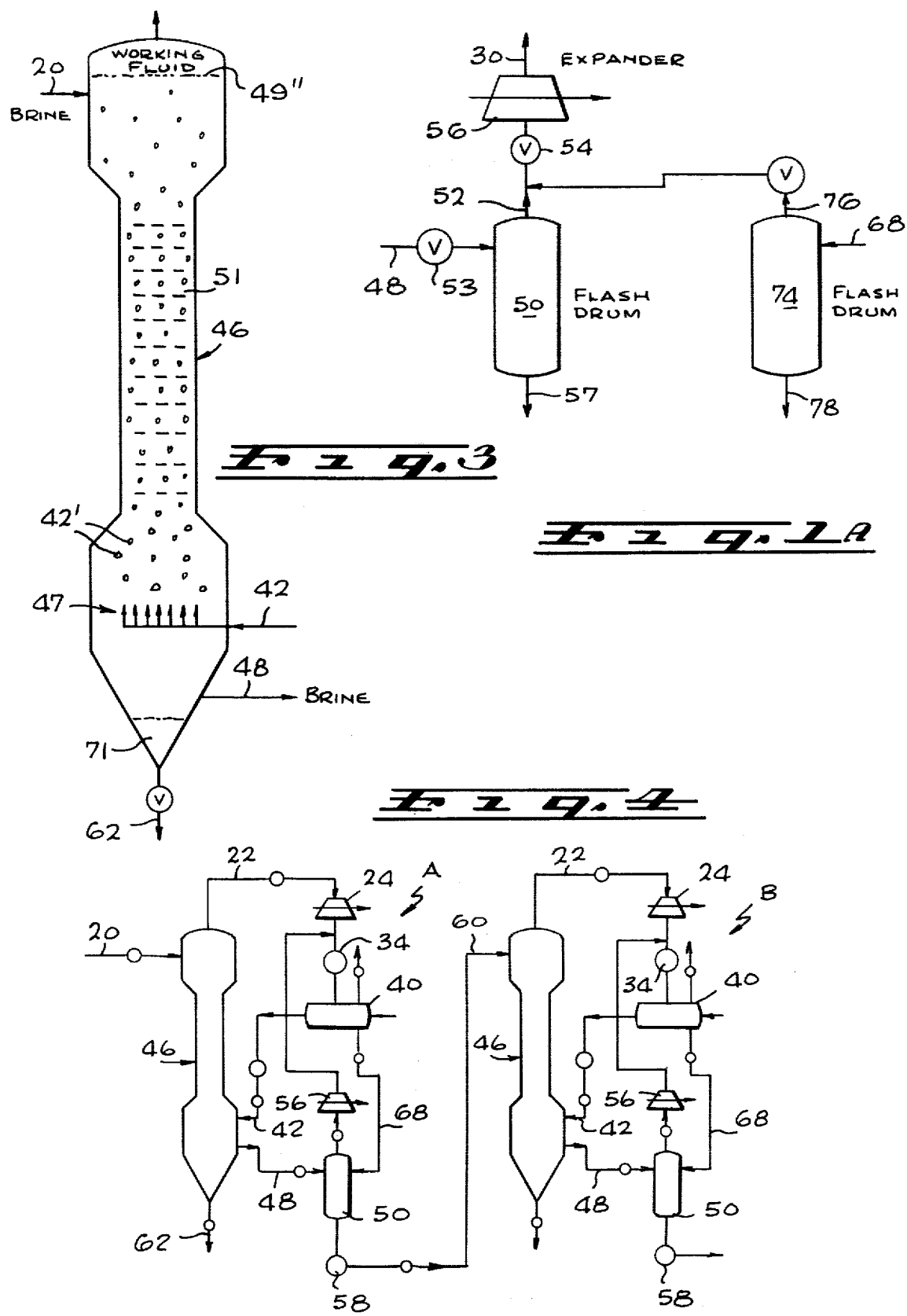

PROCESS AND SYSTEM FOR RECOVERY OF ENERGY FROM GEOTHERMAL BRINES AND OTHER HOT WATER SOURCES

This is a continuation, of application Ser. No. 589,068, filed June 23, 1975 now abandoned.

BACKGROUND OF THE INVENTION

This invention relates to the recovery of energy from geothermal brines and other hot water sources, and is particularly concerned with a process and system of the aforementioned type, employing direct contact heat exchange between the hot brine or hot water feed, and a working fluid under certain pressure and temperature conditions, wherein the heated working fluid is expanded to produce work, and the expanded and discharge working fluid is recycled to the heat transfer column, and further providing for working fluid recovery under conditions to afford an economic balance between energy recovery and working fluid loss.

In prior art processes and systems for recovery of energy from geothermal brines and other hot water sources, employing heat exchange between the hot brine or hot water, and a working fluid, there has been no recognition heretofore of the problem of obtaining a heat balance in the heat transfer column with close temperature differentials or $\Delta t$'s between brine or water and working fluid, to obtain maximum efficiency. The prior art also has failed to recognize the problem of working fluid loss in uncondensible gases which come into the system particularly with the hot brine or hot water and which must be vented. Further, the prior art has failed to provide for the problem of working fluid loss in exit brine or hot water from the heat transfer column, and recycle of such recovered working fluid to the heat transfer column.

It is accordingly a chief object of the invention to provide a process and system for recovery of energy from geothermal brines and hot water sources by operation of a heat transfer column preferably providing direct heat transfer between the hot brine or hot water, and a working fluid, under conditions of operation particularly with respect to pressure in the heat transfer column and temperature of the hot brine or hot water feed, in relation to the critical pressure and temperature of the working fluid, to allow maximum energy recovery for any individual working fluid. A further object is the provision in the procedure and system, for removal of working fluid from the exit brine or water from the column and recovery of such working fluid. A still further object is the control of the working fluid concentration in the uncondensible vent gas from the system to obtain an economic balance between energy recovery from the process and system, and working fluid loss in the uncondensible vent gas.

BRIEF SUMMARY OF THE INVENTION

The above objects are achieved according to the invention by the provision of a process and system for recovering energy from geothermal brines and other hot water sources such as ground waters heated by solar energy or other means, the energy being recovered from the brine or hot water using a working fluid such as a hydrocarbon, e.g. n-butane. The working fluid is heated by the brine or hot water preferably in a direct contact heat transfer column. The heated working fluid is passed through an expander to produce work, which is used to generate electricity or drive equipment. The working fluid from the expander is condensed in a cooler. Condensed working fluid, water and uncondensed gas are separated in an accumulator. The cool liquid working fluid is pumped from the accumulator to the heat transfer column to be heated and carried through the cycle repeatedly.

Cooled brine or water which heated the working fluid in the heat transfer column exits from the bottom of the column which acts as a liquid-liquid separator to minimize entrainment of the working fluid. This cooled brine or water withdrawn from the column is mixed with water separated from the working fluid in the accumulator, and is flashed at a pressure lower than that in the accumulator to flash off entrained and dissolved working fluid in the brine or water from the heat transfer column. The flashed working fluid is then compressed and fed to the cooler at the discharge from the expander, which is used to condense working fluid, and thus is recovered.

Uncondensible gases which are introduced into the system with the feed brine or hot water are vented from the system at the accumulator, and carry away some of the expanded working fluid. If desired, stripping of the cooled brine or water withdrawn from the column, with uncondensed gas from the accumulator for recovery of working fluid from such brine or cool water can be employed, if necessary, to further decrease the loss of working fluid in such exit brine or water.

Uncondensed gas is vented from the accumulator preferably under pressure control set for an economic balance between working fluid loss in the vent gas and energy recovery in the expander. If necessary, in order to decrease the loss of working fluid in the vent gas, the hot water or brine feed to the heat transfer column is initially degassed. This operation will decrease the amount of uncondensible vent gas from the accumulator, and the loss of working fluid therewith.

An important feature of the above described invention process and system resides in operating the heat transfer column at or above the critical pressure of the working fluid, with the hot brine or hot water at or above the critical temperature of the working fluid, and converting the working fluid to a dense phase fluid, as defined hereinafter. This procedure provides for operation in the region which will allow maximum energy recovery for any individual working fluid. It also eliminates the large temperature differential or $\Delta t$ region at the working fluid's vaporization point which requires operation with large brine or water to working fluid $\Delta t$'s to allow the system to achieve heat balance.

In normal operation, since the cooled brine or water exiting the column and which is flashed off to recover entrained or dissolved working fluid, can still be at a relatively high temperature, in order to maximize the recovery of energy from the hot brine or hot water feed, two or more units of the basic system noted above can be employed in series, the flashed exit brine or water from one unit of the system serving as the feed to the heat transfer column of the second like unit, etc. In such modification a different working fluid is usually employed in the heat transfer column of the second unit from the working fluid in the heat transfer column of the first unit, in order to adjust the critical temperature conditions of the working fluid in the second heat transfer column with respect to the temperature of the feed brine or water to such heat transfer column of the second unit.

Another invention feature is the use of mixtures of working fluids, e.g. in the heat transfer column of the above noted second unit, in order to adjust the critical properties of the working fluid therein, with respect to the temperature of the hot brine or hot water feed thereto, and to obtain optimum operation.

A further feature of the invention is the flashing or stripping of working fluid contained in the exit brine or water from the heat transfer column, followed by compression and condensation of such working fluid to provide recovery of working fluid from such exit brine or water.

A still further feature of the invention is the degassing of feed brine or hot water prior to introduction into the heat transfer column, and accumulator pressure control for economic balance between energy recovery and working fluid loss in the vent gas from the accumulator, affording minimum working fluid loss.

The invention system including particularly a combination of certain of the above featurs affords an economical and highly practical process and system for energy recovery from geothermal brines and other hot water sources.

THE DRAWINGS

The above and other features and advantages of the invention will be more clearly understood by reference to the following detailed description of the invention, taken in connection with the accompanying drawings wherein:

FIG. 1a is a modification of the process and system of FIG. 1, employing two flash drums;

FIG. 2 is a further modification of the process and system illustrated in FIG. 1, employing a stripping column for working fluid recovery instead of a flash drum;

FIG. 3 illustrates a modification of the process and system of FIG. 1, wherein the brine or water feed to the heat transfer column is the continuous phase; and FIG. 4 is a modification of the basic system illustrated in FIG. 1, employing a plurality of the basic units shown in FIG. 1.

DETAILED DESCRIPTION

Figure 1:
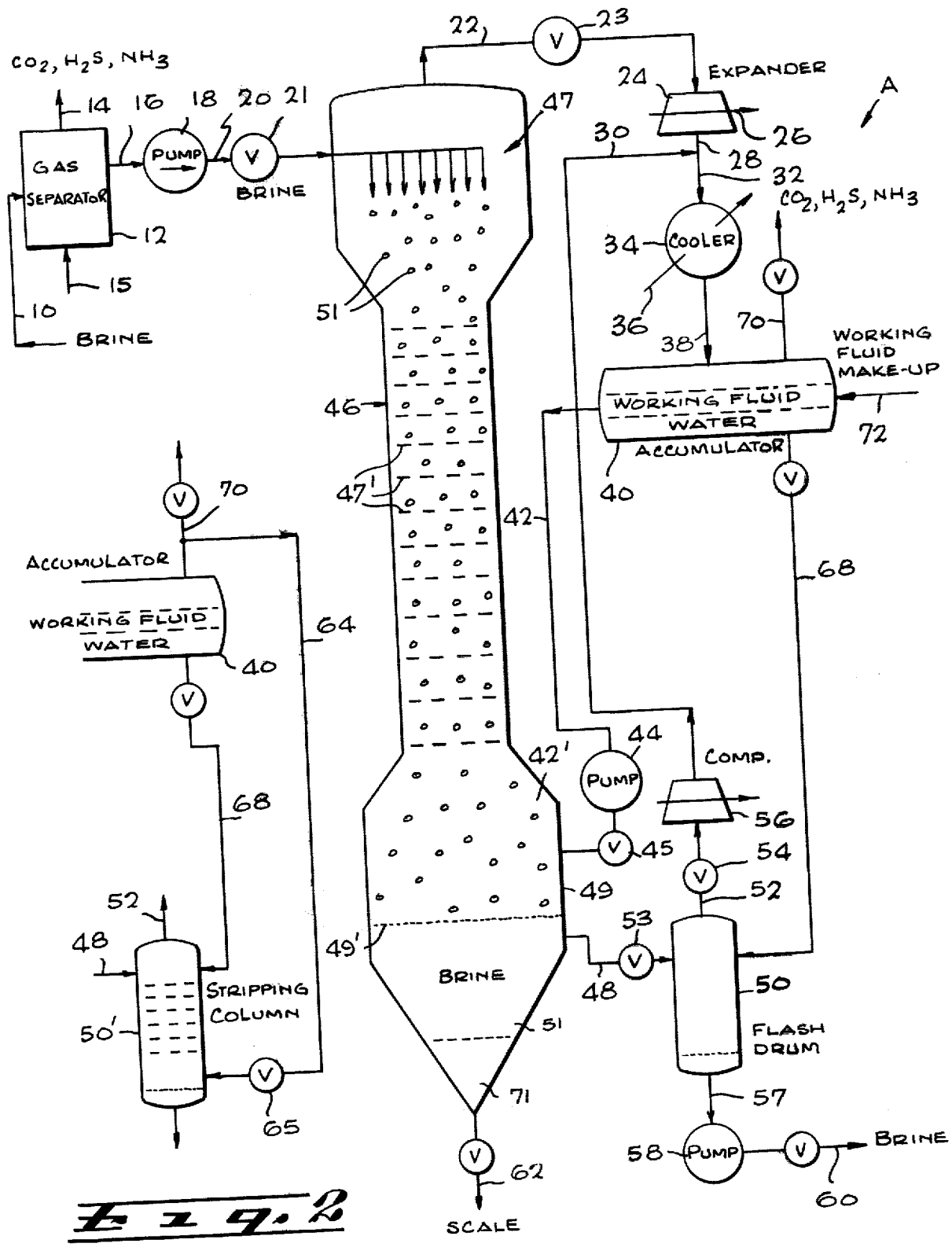
FIG. 1 is a flow chart illustrating a preferred mode of practice of the invention process and system.

Referring to FIG. 1 of the drawing, geothermal brine or hot water enters through inlet means or conduit 10 into degassing unit 12 where uncondensible gases are removed through outlet means or conduit 14. For this purpose steam stripping can be used, the steam being introduced at 15 into the degasser. If desired, other means such as the use of a solid adsorption medium, e.g. a zeolite, or other means can be employed for this purpose. Usually, the uncondensible gases in hot geothermal brine include $CO_2$, $H_2S$ and $NH_3$.

The degassed hot water or brine then passes through conduit means 16 to pump 18 which discharges through the conduit means 20 via valve 21 into the top of a heat transfer column 46 in direct contact heat exchange with a working fluid. Such working fluid can be any suitable material which does not undergo a density inversion. For example, a density inversion would correspond to a situation where the density of the working fluid at the cold end of the column is greater than the density of the brine or water at that end of the column, and at the hot end of the column the density of the working fluid is less than the density of the brine or water at that end of the column, thereby preventing countercurrent flow of working fluid and water containing fluid such as brine.

Thus, the working fluid can be a hydrocarbon including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane (2,2-dimethylpropane), n-hexane, cyclohexane, n-heptane, n-octane, isooctane, and the analogous olefins such as n-butene, isobutene, and the like. Most desirably, paraffinic or olefinic hydrocarbons containing from about 2 to about 5 carbon atoms are employed. Aromatic hydrocarbons such as benzene, toluene and xylene also can be used.

Mixtures of such hydrocarbons can also be utilized, such as, for example, a mixture of methane and ethane, ethane and n-propane, or n-propane and n-butane, in order to optimize the critical temperature and pressure conditions of the working fluid, and thereby obtain maximum energy recovery from the geothermal brine or hot water feed.

Working fluids other than hydrocarbons also can be used, such as ethers, e.g. dimethyl, diethyl and methyl ethyl ether. Other substances are also suitable provided they do not undergo the above noted density inversion. In this respect the fluorocarbons known as "Freons" undergo such density inversion and thus are unsuitable.

The hot water or brine is fed to the column at or above the critical temperature of the particular working fluid employed in the column. Inlet temperature of the hot water or brine to the top of the column ranges from about 60° to about 600° F., usually about 100° to about 600° F., with the range of about 150° to about 400° F. being preferred. The heat transfer column 46 is operated at or above the critical pressure of the working fluid in the top of the column, such pressure preferably ranging from about 450 psia to about 1,000 psia. The working fluid is heated in the heat exchange column 46 by direct contact with the incoming hot brine or hot water. For this purpose a distributor 47 is provided at the top of the column, which can be in the form of a manifold having a plurality of spray nozzles (not shown) for spraying the hot brine or hot water at 51 downwardly into the column. However, other types of distributors can be employed such as a multiple "V" notched weir type, the distributor functioning to obtain sufficiently small drop sizes of hot liquid brine or water to provide good heat transfer rates.

The heat transfer column 46 can be of any conventional type such as disk-and-doughnut which would prevent back mixing and provide a large open area for any scale problems. The upper region of the column where the working fluid is more like a gas than a liquid can employ angle iron trays (not shown) similar to those used in ethylene plant wash towers. Perforated plate dual flow trays as indicated schematically at 47' can be used with a high agitation, keeping any scale suspended.

The lower portion 49 of the heat transfer column functions as a liquid-liquid separator and can be a simple gravity separator or parallel plates (not shown) can be provided to improve separation and minimize entrainment of working fluid. However, any entrained working fluid can be recovered in the working fluid recovery section shown in FIG. 1 and described in greater detail below.

In the system described above, and illustrated in FIG. 1, the working fluid 42' passing upwardly in the column countercurrent to the flow of feed brine or water, is the continuous phase, and the brine or water distributed into the top of the column is the discontinuous phase, the interface 49' between the working fluid and the brine or water phases being at the bottom of the column.

As previously noted, the heat exchange column 46 is operated so that the working fluid in the top zone of the column will be at or above the working fluid's critical temperature, and the partial pressure of the working fluid in the working fluid stream at the top zone will be at or above the working fluid's critical pressure. This mode of operation removes the high localized heat load due to the heat of vaporization which is experienced at subcritical conditions. Thus, such operation causes the working fluid to be converted from a liquid to a dense phase fluid at or above the critical temperature of the fluid and at a partial pressure equal to or greater than its critical pressure. The term "dense phase fluid" means any fluid at or above its critical temperature. Therefore, there is no heat of vaporization and no large $\Delta t$ at the vaporization point. Consequently, the heat transfer column can heat balance with close $\Delta t$'s between inlet brine or water and working fluid.

The heated dense phase working fluid in the top of the column is passed through conduit 22, via valve 23, to a work expander 24, where it expands to produce work which is transmitted through shaft 26. The expander outlet pressure can range from about 1 to about 600 psia, but is preferably in the range of about 30 to about 2500 psia.

The expander working fluid is then passed via conduit 28, wherein it is mixed with recovered working fluid from line 30, and the resulting mixture passes via line 32 into a cooler 34, using cool water or air fed through line 36 as cooling medium to condense working fluid. Condensation temperature in the cooler preferably is in the range of about 80° F. to about 140° F. The condensed working fluid is then fed through conduit 38 to an accumulator 40.

Water vapor present in the working fluid in line 22 condenses in expander 24 and cooler 34, and is separated from condensed working fluid in accumulator 40, along with any uncondensibles not removed in the degasser 12.

As previously pointed out, uncondensed gas containing some working fluid is vented at 70 from the accumulator under pressure control set for an economic balance between working fluid loss in the vent gas and energy recovery in the expander. As previously noted, working fluid loss in the vent gas is decreased by degassing the inlet hot brine or hot water feed, as at 12. Accordingly, operation of accumulator 40 is carried out at a pressure greater than the saturation pressure of the working fluid, which is fixed by the temperature set in the accumulator, and which is essentially fixed by the available cooling water temperature or ambient air temperature.

This procedure reduces the concentration of working fluid vapors in the uncondensible stream vented through line 70. The following relation holds approximately:

$$Y_{wf} = \frac{P^\circ_{wf}}{P_t}$$

Where, $Y_{wf}$ is the mole fraction of the working fluid in the vapor in the accumulator 40, $P^\circ_{wf}$ is the saturation pressure of the working fluid corresponding to the liquid working fluid temperature in the accumulator 40, and $P_t$ is the total pressure in the accumulator 40 set by the control system. The higher the setting of $P_t$, the lower the loss of working fluid in the vent gas, but also the lower the work removed from the system by expander 24 through shaft 26. There will be an economic balance point for the value of $P_t$. Accordingly, the pressure in the accumulator to meet the above criteria corresponds to the expander outlet pressure less the pressure drop through the cooler 34.

The condensed working fluid in accumulator 40 is removed through line 42 and through pump 44 to pressurize the working fluid approximately to the pressure in heat transfer column 46 and the pressurized fluid is then fed via valve 45 to the bottom portion 49 of the heat transfer column 46, to be reheated. Cooled brine or water at 51 in the bottom of the heat transfer column is fed via line 48 and valve 53 therein to a flash drum 50, which is at a lower pressure than that in the accumulator. The preferred flash drum pressure is in the range of about 15 psia to about 250 psia, and the preferred flash drum temperature is in the range of about 80° F. to about 140° F. Water from accumulator 40 is fed through line 68 to flash drum 50

The working fluid flashed off in drum 50 from the cooled brine or water at 48 and the water from the accumulator, is fed through line 52 and via valve 54 to a compressor 56. The working fluid is compressed to a pressure corresponding to the above noted pressure at the work expander outlet, and preferably ranging from about 30 psia to about 250 psia. The compressed working fluid is then returned for cooling and recovery through line 30, for admixture with the working fluid expander discharge in line 28.

Uncondensible gases plus working fluid losses are vented from the system and the accumulator 40, through line 70. Make-up working fluid can be introduced into the accumulator at 72. Cooled brine or water is discharged at 57 from the flash drum 50 through pump 58 and line 60. Any scale formed in the heat exchanger column 46 is separated at 71 in the bottom of the heat transfer column and discharged through line 62.

Use of the flash drum 50 which is held at a lower pressure than the accumulator 40, to separate flashed vapors of working fluid which are then compressed in compressor 56 so that working fluid can be recovered by cooling and condensation, is a feature of the invention process and system. Reduction of pressure in the flash drum below the saturation pressure of working fluid at the bottom of column 46 will cause entrained working fluid in line 48 to vaporize in the drum 50. Also, dissolved working fluid in both the cooled brine or water at 48 and in the water at 68 from the accumulator, will partially vaporize in the flash drum. The extent of dissolved working fluid vaporization is relatively high due to the nonideal nature of the solution.

If desired, referring to FIG. 1a, condensed water in line 68 withdrawn from the accumulator, alternatively can be introduced into a separate flash drum 74, similar to 50, with the flashed working fluid exiting therefrom at 76 being mixed with the flashed working fluid at 52 withdrawn from the flash drum 50, and the mixed working fluid passed to the intake of the compressor 56. This modification permits removal of water at 78 from the separator 74, of a purity sufficient for use as drinking water.

According to another modification, additional working fluid can be removed in the process and system illustrated in FIG. 1 if flash drum 50 is replaced by a stripping column. This modification is illustrated in FIG. 2 of the drawing, employing a stripping column 50' with a portion of uncondensible gas in line 70, which contains some working fluid, recycled via line 64 and valve 65 to the stripping column 50' for stripping working fluid from the cooled brine or water in line 48 and from the accumulator water at 68. The stripping gas in line 64 consists of carbon dioxide, hydrogen sulfide and ammonia, which enter with the brine or hot water feed at 10. Where, however, the column feed is hot water which has been solar heated, the stripping gas in line 64 can be a mixture of nitrogen and oxygen resulting from the solubility of the air in the water.

Since the flash drum 50 or the stripping column 50' operates at a pressure lower than that in the accumulator 40 at the outlet of the expander-cooler system, as previously noted, any entrained or dissolved working fluid in the brine or water entering the flash drum or stripping column through line 48 will substantially vaporize. When the liquid working fluid phase is thus removed from the brine or water entering at line 48, the equilibrium working fluid concentration in the brine or water becomes very small compared to what it is in the presence of the liquid working fluid phase. Therefore, losses of working fluid in the exit brine or water at 60 are very low.

However, as previously noted, losses of working fluid occur in the exit $CO_2$, $H_2S$ and $NH_3$ gas at 70 from the accumulator 40. At least part of this gas is stripped out of the brine by the working fluid in the heat transfer column 46. The stripped gas purged at 70 will carry working fluid away with it. The accumulator pressure can be raised relative to the accumulator temperature to decrease the concentration of working fluid in the accumulator gas at 70. However, this mode of operation decreases the amount of energy that can be extracted from the system. At practical energy recovery levels, the purged gas at 70 will still contain substantial quantities of working fluid, of the order of about 50 to about 80% by weight. Thus, removal of gases from the geothermal brine or hot water prior to feeding the brine to the heat transfer column, e.g. by steam stripping or adsorption on a solid material, as at 12, is preferred, for reducing such working fluid losses.

In the process and system illustrated in FIG. 1, the working fluid is the continuous phase. However, in the embodiment illustrated in FIG. 3, the distributor 47 can be positioned in the bottom of the heat transfer column and the pressurized working fluid in line 42 passed into the distributor and sprayed upwardly in the column in countercurrent direct heat exchange relation with the brine or water entering at the top of the column. In this embodiment the water containing or brine phase 51 is the continuous phase, the working fluid is the discontinuous phase, and the interface 49" between the brine or water and the working fluid phase is at the top of the column.

In order to avoid temperature pinch in the column, that is a substantial reduction of the temperature differential between the hot brine or water and the working fluid along the length of the column, thereby substantially reducing heat transfer from the hot brine or water to the working fluid, the rate of circulation of the working fluid in the column must be decreased. However, as the flow rate of the working fluid is decreased this increases the temperature of the cooled brine or water in the bottom of the column, leaving substantial heat energy remaining in the cooled brine or water exiting the bottom of the column. Thus, where the hot brine or hot water feed is, for example, 322° F., the exiting cooled brine or water at 48 can be at a relatively high temperature of about 180° F.

In order to recover the remaining energy from the water or brine leaving the system at 48 and 60 in FIG. 1, and referring to FIG. 4, such exiting brine or water is fed into the heat transfer column 46 of a second unit B essentially identical to the energy recovery unit A illustrated in FIG. 1, and including elements 46, 24, 34, 40, 50 and 56, unit B being in series with Unit A, and the operating cycle described above is repeated in unit B. In the unit B, however, a different working fluid, preferably a mixture of hydrocarbons, e.g. a mixture of ethane and propane, is generally used to adjust the critical temperature conditions of such working fluid in relation to the temperature of the incoming brine or water feed at 60. The result is the recovery of additional energy in unit B from each unit of weight of brine or water exiting unit A.

The following is an example of practice of the invention process and system, it being understood that such example is merely illustrative and not limitative of the invention.

EXAMPLE 1

Hot water at 322° F. is pumped into the top of a heat transfer column operated at an internal pressure of 575 psia. In the heat transfer column the hot water is passed into direct contact heat exchange relation with isobutane. The working fluid circulation in the column is set low enough to be sure that there is no temperature pinch or substantially reduced $\Delta t$ driving force between the temperature of the hot water and the isobutane working fluid throughout the length of the column.

The isobutane working fluid thus heated by the hot water feed in the heat transfer column is converted to a dense phase fluid at a pressure of 565 psia and temperature of 300° F., and is expanded through an expander to produce work. The expanded working fluid discharged from the expander is at a temperature of 178° F. and a pressure of 142 psia.

The isobutane working fluid is cooled and condensed in a cooler to an outlet temperature of 100° F. and a pressure of 132 psia. The isobutane working fluid condensate thus formed is introduced into an accumulator and is separated therein from uncondensible gases and condensed water. The condensed isobutane from the accumulator is then pumped at about 575 psia back into the bottom of the heat transfer column to be reheated by the hot water feed.

Cooled water from the bottom of the heat transfer column at a temperature of about 182° F. and water separated in the accumulator are fed to a flash drum operated at a pressure of 15 psia. The isobutane working fluid flashed off from the top of the flash drum is compressed to a pressure of about 142 psia and is mixed with isobutane working fluid discharged from the expander, and the resulting mixture is returned to the cooler for condensation and recovery of working fluid in the accumulator.

Water at about 182° F. is removed from the flash drum and pumped to a solar heater where it is heated to 322° F. and recycled as feed to the heat transfer column.

The uncondensible gases including nitrogen and oxygen, are vented from the system at the accumulator, carrying away some of the isobutane working fluid.

Make-up isobutane working fluid is introduced at a pressure of 132 psia into the accumulator to compensate for lost working fluid from the accumulator.

Calculated on a basis of the use of 0.65 lb isobutane working fluid to 1 lb of hot feed water, 8.8 Btu of net work is obtained from the system, considering all equipment including the expander and the pumps operating at 80% efficiency.

Removal of dissolved nitrogen and oxygen from the hot water feed prior to feeding the hot water to the heat transfer column decreases the amount of working fluid make-up and allows the expander outlet pressure to be reduced, thus allowing an increase in net work out of the system.

Energy can also be recovered according to the invention from water sources at lower temperatures than geothermal brines. Thus, for example ocean brines, which are solar heated, and often at temperatures substantially lower than 100° F., e.g. down to about 60° F., can be used as feed in the invention process and system. Such brines are also understood to be encompassed within the term "hot water sources" employed herein, as contrasted to sea water brines of substantially lower temperature, for example deep sea water at about 35° F. Where ocean brine at a temperature of about 60° F. is employed as feed to the invention process and system, the working fluid is preferably in the form of a mixture of ethane and a small amount of methane, in order to provide a working fluid having a critical temperature such that the brine feed temperature is above the critical temperature of such working fluid.

From the foregoing, it is seen that the invention affords a novel and efficient process and system for recovery of energy from geothermal brines and other hot water sources, employing direct contact heat exchange between the hot geothermal brine or hot water and a working fluid, preferably a hydrocarbon such as propane, n-butane or isobutane, for extraction of energy from the heated working fluid in an expander, and incorporating procedure and means for efficient recovery of working fluid and recycling thereof for heat transfer with the geothermal brine or other hot water feed.

While I have described particular embodiments of my invention for purposes of illustration, it will be understood that various changes and modifications within the spirit of the invention can be made, and the invention is not to be taken as limited except by the scope of the appended claims.

What is claimed is:

1. Process for recovery of energy from hot water-containing fluids including geothermal brines and other hot water sources, which comprises
   (A) introducing a hot water-containing fluid in a heat transfer zone in direct contact heat exchange relation with a working fluid in liquid form, to heat and convert said working fluid to a heated dense phase fluid containing water and uncondensible gas, and produce a cooled water-containing fluid containing working fluid, said heat transfer zone being maintained at or above the critical pressure of said working fluid, and said hot water-containing fluid being at a temperature at or above the critical temperature of said working fluid,
   (B) withdrawing said heated dense phase working fluid containing water vapor and uncondensible gas from said heat transfer zone,
   (C) introducing and expanding said heated dense phase working fluid containing water vapor and uncondensible gas, in an expander to produce work, and expanded working fluid containing water vapor and uncondensible gas,
   (D) discharging said expanded working fluid containing water vapor and uncondensible gas from said expander,
   (E) withdrawing said cooled water-containing fluid from said heat transfer zone,
   (F) flashing said cooled water-containing fluid containing working fluid to flash off said working fluid,
   (G) compressing said working fluid after said flashing,
   (H) mixing said working fluid after said compression with the expanded working fluid discharged from said expander to form a mixture,
   (I) cooling and condensing said mixture to produce a condensed working fluid containing condensed water vapor and uncondensible gas,
   (J) separating said condensed working fluid from said condensed water vapor and uncondensible gas, and
   (K) returning after said separation said condensed working fluid under pressure to said heat transfer zone for reheating therein.

2. Process for recovery of energy from hot water-containing fluids including geothermal brines and other hot water sources which comprises
   (A) introducing a water-containing fluid containing uncondensible gas in a heat transfer zone in direct contact heat exchange relation with a working fluid in liquid form to heat and convert said working fluid to a heated dense phase fluid containing water vapor and uncondensible gas and produce a cooled water-containing fluid containing working fluid, said heat transfer zone being maintained at or above the critical pressure of said working fluid, and said hot water-containing fluid being at a temperature at or above the critical temperature of said working fluid,
   (B) withdrawing said dense phase fluid containing working fluid from said heat transfer zone,
   (C) introducing and expanding said heated dense phase working fluid containing water vapor and uncondensible gas in an expander to produce work and an expanded working fluid containing water vapor and uncondensible gas,
   (D) discharging said expanded working fluid from said expander,
   (E) withdrawing said cooled water-containing fluid containing working fluid from said heat transfer zone,
   (F) flashing said cooled water-containing fluid to flash off said working fluid,
   (G) compressing said working fluid after said flashing,
   (H) mixing said working fluid after said compression with the working fluid discharged from said expander to form a mixture,
   (I) cooling and condensing said mixture to produce a condensed working fluid containing condensed water vapor and uncondensible gas,
   (J) separating in an accumulator zone, said condensed working fluid from condensed water vapor and uncondensible gas, said flashing in Step (F) being conducted at a pressure less than the pressure in said accumulator zone, (K) returning after said separation said condensed working fluid under pressure to said heat transfer zone for reheating therein, and (L) withdrawing a vent gas containing uncondensible gas from said accumulator zone.

3. The process as defined in claim 2, including (i) withdrawing said cooled water-containing fluid at a moderately elevated temperature from said flash zone, (ii) introducing said cooled water-containing fluid into a second heat transfer zone in direct contact heat exchange relation with a second working fluid in liquid form, said second working fluid being different from said first working fluid, to heat and convert said second working fluid to a second heated dense phase fluid, and produce a cooled water-containing fluid containing said second working fluid, said second heat transfer zone being maintained at or above the critical pressure of said second working fluid, and said water-containing fluid introduced into said second heat transfer zone being maintained at a temperature at or above the critical temperature of said second working fluid, (iii) withdrawing said heated second dense phase working fluid containing water vapor and uncondensible gas from said second heat transfer zone, (iv) introducing and expanding said heated second dense phase working fluid containing water vapor and uncondensible gas in a second expander to produce work and expanded second working fluid containing said water vapor and uncondensible gas, (v) discharging said expanded second working fluid containing said water vapor and uncondensible gas from said second expander, (vi) cooling and condensing said expanded second working fluid to produce a condensed working fluid containing condensed water vapor and uncondensible gas, (vii) separating said resulting condensed working fluid from said condensed water vapor and uncondensible gas, and (viii) returning said condensed second working fluid under pressure to said second heat transfer zone.

4. The process as defined in claim 3, wherein the working fluid in the first heat transfer zone is a single paraffin or olefin hydrocarbon containing from about 1 to about 8 carbon atoms, and said second different working fluid is a mixture of such hydrocarbons.

5. The process as defined in claim 4, including (a) said separating of said condensed second working fluid from said condensed water vapor and uncondensible gas taking place in a second accumulator zone, (b) withdrawing a vent gas from said second accumulator zone, (c) withdrawing said cooled water-containing fluid from said second heat transfer zone, (d) flashing said cooled water-containing fluid containing said second working fluid to flash off said second working fluid, (e) compressing said second working fluid after said flashing, and (f) mixing said second working fluid after said compression with the second expanded working fluid prior to said cooling and condensing.

6. The process as defined in claim 2, including (i) withdrawing said condensed water vapor containing working fluid from said accumulator zone, (ii) passing said condensed water vapor containing working fluid into a second flash zone, (iii) flashing said condensed water vapor containing working fluid to flash off said working fluid, and (iv) mixing said working fluid after said flashing with working fluid from the first mentioned flash zone prior to compression thereof, and withdrawing water from said second flash zone.

7. The process as defined in claim 2, including withdrawing condensed water vapor from said accumulator zone and passing said condensed water vapor into said flash zone.

8. The process as defined in claim 7, including passing a portion of said vent gas containing uncondensibles and some working fluid withdrawn from said accumulator zone, into said flash zone.

9. The process as defined in claim 8, including the step of removing at least a portion of uncondensible gas in said hot water containing fluid prior to introduction thereof into said heat transfer zone.

10. The process as defined in claim 9, said working fluid being a paraffinic or olefinic hydrocarbon selected from the group consisting of ethane, propane, methane, n-butane, isobutane, n-pentane, isopentane and neopentane, and the analogous olefins, and mixtures thereof.

11. The process as defined in claim 2, said heat transfer zone being a heat transfer column, said hot water containing fluid being in direct contact heat exchange relation with said working fluid in said heat transfer column, said hot water containing fluid being introduced into said heat transfer column at a temperature ranging from about 100° to about 600° F., and said heat transfer column being maintained at a pressure ranging from about 450 to about 1,000 psia, the expander outlet pressure being in the range of about 1 to about 600 psia, said working fluid being cooled and condensed to a temperature in the range of about 80° to about 140° F., and said flash zone being maintained at a pressure ranging from about 15 to about 250 psia and at a temperature ranging from about 80° to about 140° F.

12. The process as defined in claim 11, including withdrawing condensed water vapor from said accumulator zone and passing said condensed water vapor into said flash zone, and passing a portion of said vent gas containing uncondensibles and some working fluid withdrawn from said accumulator zone, into said flash zone.

13. The process as defined in claim 12, including the step of removing at least a portion of uncondensible gas in said hot water containing fluid prior to introduction thereof into said heat transfer column.

14. The process as defined in claim 13, said removal of at least a portion of uncondensible gas in said hot water containing fluid prior to introduction thereof into said heat transfer column, and the pressure in said accumulator zone being controlled to obtain a predetermined balance between energy recovery in said expander and working fluid loss in said vent gas from said accumulator zone.

15. Process for recovery of energy from hot water-containing fluids including geothermal brines and other hot water sources, which comprises (A) pumping said hot water-containing fluid into the top zone of a heat transfer column in direct contact heat exchange relation with a working fluid in liquid form, said working fluid being a paraffinic or olefinic hydrocarbon containing from about 1 to about 8 carbon atoms, or mixtures thereof, to heat and convert said working fluid to a heated dense phase fluid containing water vapor and uncondensible gas, and produce a cooled water-containing fluid containing working fluid, said heated dense phase fluid in said top zone of said heat transfer column in direct contact heat exchange relation with said hot water-containing fluid therein, being at or above the critical temperature of said working fluid, and the partial pressure of said heated dense phase fluid in said top zone being at or above the critical pressure of said working fluid,
(B) withdrawing said heated dense phase fluid containing water vapor and uncondensible gas from said column,
(C) introducing and expanding said heated dense phase fluid containing water vapor and uncondensible gas, in an expander to produce work, and expanded working fluid containing water vapor and uncondensible gas,
(D) discharging said expanded working fluid containing water vapor and uncondensible gas from said expander,
(E) withdrawing said cooled water-containing fluid containing working fluid from the bottom zone of said heat transfer column and passing said fluid to a flash zone,
(F) flashing the cooled water containing fluid in said flash zone to flash off working fluid,
(G) compressing said working fluid after flashing to produce compressed working fluid,
(H) mixing said compressed working fluid with the working fluid discharged from said expander to form a mixture,
(I) cooling and condensing said mixture to produce a condensed working fluid containing condensed water vapor and uncondensible gas,
(J) separating said condensed working fluid from said condensed water vapor and uncondensible gas in an accumulator zone, said flashing in step (F) being carried out in the flash zone at a pressure less than the pressure in said accumulator zone,
(K) returning said condensed working fluid to the lower zone of said heat transfer column for reheating therein,
(L) withdrawing a vent gas containing uncondensible gas from said accumulator zone, and
(M) withdrawing said condensed water vapor from said accumulator zone and passing said condensed water vapor into said flash zone.

16. The process as defined in claim 15, including discharging cooled water containing fluid from said flash zone, and removing any scale from the bottom zone of said heat transfer column.

17. The process as defined in claim 15, said hot water containing fluid being introduced into said heat transfer column at a temperature ranging from about 150° to about 400° F., and said heat transfer column being maintained at a pressure ranging from about 450 to about 1,000 psia, the expander outlet pressure being in a range of from about 30 to 250 psia, said working fluid being cooled and condensed in a cooler to a temperature in the range of about 80° to about 140° F., and said flash zone being maintained at a pressure ranging from about 15 to about 250 psia and at a temperature ranging from about 80° to about 140° F.

18. The process as defined in claim 17 wherein said hot water-containing fluid contains uncondensible gas, and including
(i) removing at least a portion of uncondensible gas in said hot water-containing fluid prior to pumping thereof into the top zone of said heat transfer column, said removal of at least a portion of uncondensible gas in said hot water-containing fluid and the pressure in said accumulator zone being controlled to obtain a predetermined balance between energy recovery in said expander and working fluid loss in said vent gas from said accumulator zone,
(ii) discharging cooled water-containing fluid from said flash zone, and
(iii) removing any scale from the bottom zone of said heat transfer column.

19. System for recovering energy from hot water-containing fluids including geothermal brines and other hot water sources, which comprises in combination
(A) a heat transfer column,
(B) pump means for pressurizing and introducing hot water-containing fluid into said column,
(C) means for introducing a working fluid into said column,
(D) means for maintaining the pressure of said working fluid at or above its critical pressure in said heat transfer column and for maintaining the temperature of said working fluid at or above its critical temperature at the top of the column,
(E) an expander,
(F) means for withdrawing hot working fluid containing water vapor and uncondensible gas from said column and introducing said fluid as feed to said expander,
(G) means for discharging expanded working fluid from said expander,
(H) cooling means for cooling and condensing said expanded working fluid to produce condensed working fluid containing condensed water vapor and uncondensible gas,
(I) accumulator means for separating said condensed working fluid from condensed water vapor and uncondensible gas,
(J) conduit means interconnecting said expander with said cooling means and said cooling means with said accumulator means,
(K) means for returning said condensed working fluid from said accumulator means to said heat transfer column,
(L) conduit means for withdrawing cooled water-containing fluid containing working fluid from the bottom portion of said heat transfer column, and
(M) flash means for flashing off the working fluid in said cooled water-containing fluid, said last mentioned conduit means communicating with said flash means for introducing said cooled water-containing fluid therein.

20. The system as defined in claim 19, including means for removing at least a portion of uncondensible gas in said hot water containing fluid prior to introduction thereof into said heat transfer column.

21. System for recovering energy from hot water-containing fluids including geothermal brines and other hot water sources, which comprises in combination
(A) a heat transfer column,
(B) pump means for pressurizing and introducing hot water-containing fluid into said column, (C) means for introducing a working fluid into said column, (D) means for maintaining the pressure of said working fluid at or above its critical pressure in said heat transfer column, and for maintaining the temperature of said working fluid at or above its critical temperature at the top of the column, (E) an expander, (F) means for withdrawing hot working fluid containing water vapor and uncondensible gas from said column and introducing said fluid as feed to said expander, (G) means for discharging expanded working fluid from said expander, (H) conduit means for withdrawing cooled water-containing fluid from the bottom portion of said heat transfer column, (I) flash means for flashing off the working fluid in said cooled water-containing fluid, said last mentioned conduit means communicating with said flash means for introducing said cooled water-containing fluid therein, (J) means for compressing the working fluid withdrawn from said flash means after said flashing, (K) conduit means interconnecting said flash means and said compressing means, (L) conduit means from the discharge of said compressing means for mixing the compressed working fluid with the expanded working fluid discharged from said expander discharge means, (M) cooling means for cooling and condensing said mixture to produce condensed working fluid containing condensed water vapor and uncondensible gas, (N) accumulator means for separating said condensed working fluid from condensed water vapor and uncondensible gas, (O) conduit means interconnecting said expander with said cooling means and said cooling means with said accumulator means, and (P) means for returning said condensed working fluid from said accumulator means to said heat transfer column.

22. The system as defined in claim 21, said flash means being a flash drum.

23. The system as defined in claim 21, said combination forming a first unit, and including a second unit as aforementioned in series with said first unit, and means for withdrawing water containing fluid from said flash means of said first unit and introducing said last mentioned fluid into the pump means of said second unit for pressureizing said fluid and introducing said pressurized fluid into the heat transfer column of said second unit.

24. The system as defined in claim 21, including means for withdrawing a vent gas containing uncondensibles and some working fluid from said accumulator means, and conduit means for withdrawing condensed water vapor from said accumulator means and passing said condensed water vapor into said flash means.

25. The system as defined in claim 24, including conduit means for passing a portion of said vent gas containing uncondensibles and some working fluid from said accumulator means to said flash means.

26. The system as defined in claim 25, including means for removing at least a portion of uncondensible gas in said hot water containing fluid prior to introduction thereof into said heat transfer column.

27. The system as defined in claim 25, including means for maintaining the pressure in said flash means at a pressure less than that in said accumulator means.

28. The system as defined in claim 25, wherein said flash means is a stripping column.

* * * * *